United States Patent
Kupratis et al.

(10) Patent No.: US 11,506,146 B2
(45) Date of Patent: Nov. 22, 2022

(54) SYSTEMS AND METHODS FOR HYBRID ELECTRIC TURBINE ENGINES

(71) Applicant: RAYTHEON TECHNOLOGIES CORPORATION, Farmington, CT (US)

(72) Inventors: Daniel Bernard Kupratis, Wallingford, CT (US); Paul R. Hanrahan, Farmington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 17/350,767

(22) Filed: Jun. 17, 2021

(65) Prior Publication Data

US 2022/0056870 A1 Feb. 24, 2022

Related U.S. Application Data

(63) Continuation of application No. 16/752,020, filed on Jan. 24, 2020, now Pat. No. 11,073,107.

(51) Int. Cl.
*F02C 7/36* (2006.01)
*F02K 3/06* (2006.01)
*F02C 3/04* (2006.01)

(52) U.S. Cl.
CPC ............... *F02K 3/06* (2013.01); *F02C 3/04* (2013.01); *F02C 7/36* (2013.01);
(Continued)

(58) Field of Classification Search
CPC ...... F02K 3/06; F02C 3/04; F02C 7/36; F05D 2220/3219; F05D 2220/323;
(Continued)

(56) References Cited

U.S. PATENT DOCUMENTS 2,601,194 A 6/1952 Whittle
3,355,890 A 12/1967 Kappus
(Continued)

FOREIGN PATENT DOCUMENTS

DE 102013209538 11/2014
EP 3015696 5/2016
WO 2020008147 1/2020

OTHER PUBLICATIONS

European Patent Office, European Partial Search Report dated Sep. 1, 2021 in Application No. 21152583.7.
(Continued)

*Primary Examiner* — Steven M Sutherland
(74) *Attorney, Agent, or Firm* — Snell & Wilmer L.L.P.

(57) ABSTRACT

A hybrid electric gas turbine engine includes a fan section having a fan, a turbine section having a turbine drivably connected to the fan through a main shaft that extends along a central longitudinal axis, a gas generating core extending along a first axis that is radially offset from the central longitudinal axis, a first electric motor drivably connected to the main shaft, wherein the electric motor is colinear with the main shaft, and an electric compressor extending along a second axis that is radially offset from the central longitudinal axis, the electric compressor in fluid communication with the second turbine section.

20 Claims, 7 Drawing Sheets

(52) U.S. Cl.
CPC .............. *F05D 2220/323* (2013.01); *F05D 2220/3219* (2013.01); *F05D 2240/12* (2013.01); *F05D 2240/35* (2013.01); *F05D 2260/40311* (2013.01)

(58) Field of Classification Search
CPC ............. F05D 2240/12; F05D 2240/35; F05D 2260/40311; Y02T 50/60
See application file for complete search history.

(56) References Cited

U.S. PATENT DOCUMENTS

| | | | |
|---|---|---|---|
| 3,368,352 A | | 2/1968 | Hewson |
| 4,833,881 A | * | 5/1989 | Vdoviak ................ F23R 3/002 60/725 |
| 8,015,796 B2 | | 9/2011 | Babu |
| 8,684,304 B2 | | 4/2014 | Burns |
| 8,727,270 B2 | | 5/2014 | Burns |
| 9,908,635 B2 | | 3/2018 | Snyder |
| 9,920,689 B2 | | 3/2018 | Nalim |
| 10,024,235 B2 | | 7/2018 | Suciu |
| 10,094,281 B2 | | 10/2018 | Chandler |
| 10,641,124 B2 | | 5/2020 | Chandler |
| 11,073,107 B1 | | 7/2021 | Kupratis |
| 2010/0044504 A1 | | 2/2010 | Cazals |
| 2015/0013306 A1 | | 1/2015 | Shelly |
| 2015/0211416 A1 | | 7/2015 | Chandler et al. |
| 2015/0247456 A1 | | 9/2015 | Suciu |
| 2015/0367950 A1 | | 12/2015 | Rajashekara et al. |
| 2017/0226934 A1 | | 8/2017 | Robic et al. |
| 2018/0009536 A1 | * | 1/2018 | Christopherson ..... F01D 17/145 |
| 2018/0163558 A1 | | 6/2018 | Vondrell |
| 2018/0230845 A1 | | 8/2018 | Joshi et al. |
| 2018/0266329 A1 | * | 9/2018 | Mackin ...................... F02C 7/36 |
| 2018/0354631 A1 | | 12/2018 | Adibhatla et al. |
| 2018/0363564 A1 | | 12/2018 | Geneste |
| 2019/0323426 A1 | * | 10/2019 | Mackin ................. B64D 27/10 |
| 2019/0353104 A1 | | 11/2019 | Kupratis et al. |
| 2019/0368370 A1 | | 12/2019 | Chandler |
| 2020/0003126 A1 | * | 1/2020 | De Wergifosse ....... F16H 3/727 |

OTHER PUBLICATIONS

USPTO, Final Office Action dated Mar. 10, 2022 in U.S. Appl. No. 16/706,058.
European Patent Office, European Office Action dated Jun. 15, 2021 in Application No. 21152583.7.
USPTO, Non-Final Office Action dated Dec. 6, 2021 in U.S. Appl. No. 16/706,058.
European Patent Office, European Search Report dated Mar. 31, 2021 in Application No. 20211349.4.
USPTO Pre Interview First Office Action dated Apr. 19, 2021 in U.S. Appl. No. 16/752,020.
USPTO Notice of Allowance dated May 18, 2021 in U.S. Appl. No. 16/752,020.
USPTO Corrected Notice of Allowability dated Jun. 8, 2021 in U.S. Appl. No. 16/752,020.
USPTO, Advisory Action dated May 13, 2022 in U.S. Appl. No. 16/706,058.
USPTO, Non-Final Office Action dated Jun. 10, 2022 in U.S. Appl. No. 16/706,058.

* cited by examiner

SYSTEMS AND METHODS FOR HYBRID ELECTRIC TURBINE ENGINES

CROSS-REFERENCE TO RELATED APPLICATIONS

This application is a continuation of, and claims priority to and the benefit of, U.S. patent application Ser. No. 16/752,020 filed Jan. 24, 2020, and entitled "SYSTEMS AND METHODS FOR HYBRID ELECTRIC TURBINE ENGINES," which is incorporated herein by reference in its entirety for all purposes.

FIELD

This disclosure relates generally to gas turbine engines, and more particularly for systems and methods for hybrid electric gas turbine engines.

BACKGROUND

A gas turbine engine typically includes a fan section driven by a core engine or gas generating core arranged along a common axis. The core engine includes a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section through a driven shaft.

SUMMARY

A hybrid electric gas turbine engine is disclosed herein. The hybrid electric gas turbine engine may comprise: a fan section having a fan; a first turbine section having a turbine drivably connected to the fan through a main shaft that extends along a central longitudinal axis; a gas generating core extending along a first axis that is radially offset from the central longitudinal axis, the gas generating core comprising a second turbine section; a first electric motor drivably connected to the main shaft, the first electric motor having a central axis parallel with the central longitudinal axis; and an electric compressor extending along a second axis that is radially offset from the central longitudinal axis, the electric compressor being in fluid communication with the second turbine section.

In various embodiments, the first electric motor includes a first motor shaft extending along a first motor axis, and the first motor axis is in parallel with the central longitudinal axis. The electric compressor may comprise a second electric motor including a second motor shaft extending along a second electric motor axis, and the second electric motor axis is parallel with the second axis. The gas generating core may comprise a third electric motor including a third motor shaft extending along a third electric motor axis, and the third electric motor axis is parallel with the first axis. The first electric motor may be configured to drive the fan, and the first electric motor is configured to be driven by the fan. The second electric motor may be configured to drive the electric compressor. The third electric motor may be configured to drive the gas generating core. The third electric motor may be configured to be driven by the gas generating core. The gas generating core may be sized and configured to provide between 30% and 80% of an airflow to the second turbine section. The hybrid electric gas turbine engine may further comprise a discharge duct disposed between a compressor outlet of the electric compressor and a diffuser inlet of a combustor section of the gas generating core, the combustor section disposed forward of the second turbine section.

A hybrid electric gas turbine engine is disclosed herein. The hybrid electric gas turbine engine may comprise: a fan section having a fan and a guide vane extending from a static structure; a first turbine section having an exit housing and a turbine drivably connected to the fan through a main shaft that extends along a central longitudinal axis; a gas generating core extending along a first axis that is radially offset from the central longitudinal axis, the gas generating core including a second turbine section; a first electric motor drivably connected to the main shaft, the first electric motor being radially offset from the gas generating core; and an electric compressor extending along a second axis that is radially offset from the central longitudinal axis, the electric compressor in fluid communication with the second turbine section.

In various embodiments, the hybrid electric gas turbine engine may further comprise a support structure that extends between and operatively connects the static structure and the exit housing. The electric compressor may comprise a second electric motor, and wherein the gas generating core comprises a third electric motor. The hybrid electric gas turbine engine may further comprise a battery electrically coupled to the first electric motor, the second electric motor, and the third electric motor. The hybrid electric gas turbine engine may further comprise a controller operatively coupled to the first electric motor, the second electric motor, and the third electric motor, the controller configured to command at least one of the first electric motor and the third electric motor to power the second electric motor. At least one of the first electric motor and the third electric motor may be configured to charge the battery. The hybrid electric gas turbine engine may further comprise: a shroud extending from the static structure towards the turbine, the shroud being disposed about at least a portion of at least one of the first electric motor, the gas generating core, and the electric compressor; and a compressor inlet duct configured such that the electric compressor receives air from the fan section. The compressor inlet duct may be configured to receive the air via the guide vane.

A control system for a hybrid electric gas turbine engine is disclosed herein. The control system may comprise: a controller; a first electric motor drivably connected to a first shaft of an electric compressor of the hybrid electric gas turbine engine, the first electric motor operatively coupled to the controller; a second electric motor drivably connected to a second shaft of a gas generating core of the hybrid electric gas turbine engine, the second electric motor operatively coupled to the controller; and a third electric motor drivably connected to a third shaft of the hybrid electric gas turbine engine, the third shaft extending from a fan section to a turbine section, the third electric motor operatively coupled to the controller.

In various embodiments, the controller may be configured to command at least one of the second electric motor and the third electric motor to power the first electric motor. The control system may further comprise a battery electrically coupled to the first electric motor, the second electric motor, and the third electric motor, wherein at least one of the second electric motor and the third electric motor is configured to charge the battery. The control system may further comprise a fuel control system in fluid communication with the gas generating core.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

FIG. 7B illustrates a keyed connection of a shaft, in accordance with various embodiments Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Hybrid electric gas turbine engines, as disclosed herein, implement a gas generating core that is offset from a central longitudinal axis of the gas turbine engine, a first electric motor disposed in concentric relationship with the central longitudinal axis, a second electric motor offset from the central longitudinal axis. In this manner, the gas generating core of the hybrid electric gas turbine engine may be sized for performance during cruise conditions, and the electric motors may supplement power during non-cruise conditions when extra power is needed, such as during take-off conditions for example. The first electric motor is disposed in concentric relationship with the central longitudinal axis such that the main shaft is coupled directly to the electric motor (e.g., without the use of additional gear boxes) and the second electric motor is disposed offset from the central longitudinal axis. The second electric motor may be coupled to an electric-powered compressor. In this manner, and due to the location of the electric motors, the electric motor may be sized such that the electric motors provide sufficient boost power to support take-off conditions of the aircraft, while providing a robust connection with the main shaft. Additionally, the electric-powered compressor may provide additional airflow to a hot section of the gas generating core. A hot section of a gas generating core, as described herein, is a section including a combustor and/or a turbine.

For example, the electric motors may be sized to be a high-megawatt electric motor, such as greater than 7 megawatts (MW) in accordance with various embodiments, between 7 and 15 megawatts (MW) in accordance with various embodiments, or about 10 megawatts (MW) in accordance with various embodiments, which allows for the electric motors to provide sufficient boost power. In various embodiments, the first electric motor and the second electric motor may each be between 3.5 megawatts (MW) and 7.5 megawatts (MW). In various embodiments, the first electric motor and the second electric motor may each be approximately 5 megawatts (MW).

Figure 1:
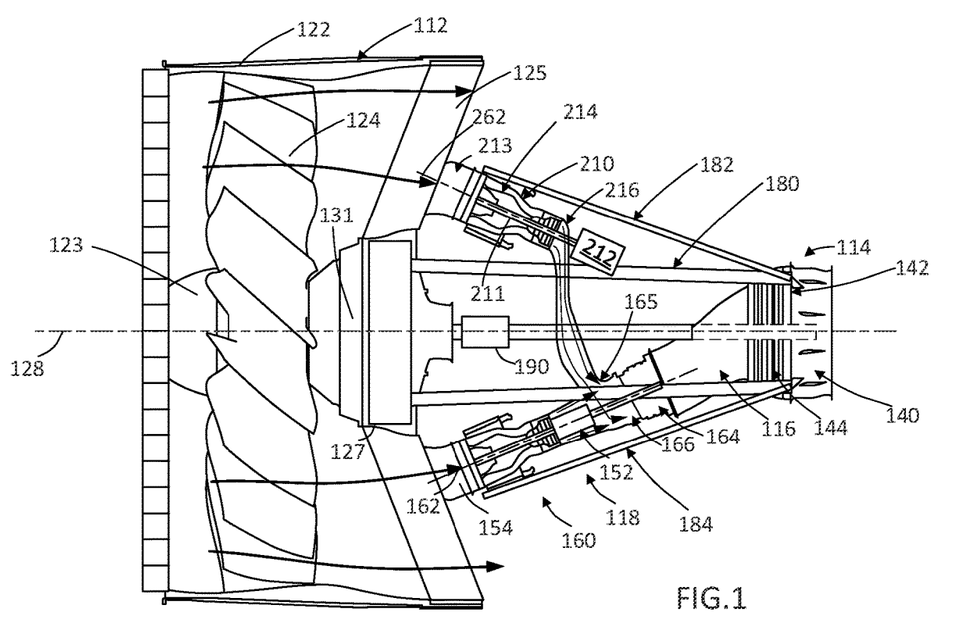
FIG. 1 illustrates a partial cross-sectional view of a hybrid electric gas turbine engine, in accordance with various embodiments.

FIG. 1 schematically illustrates a hybrid electric gas turbine engine 100. The hybrid electric gas turbine engine 100 includes a fan section 112, a turbine section 114, an exhaust duct 116, at least one gas generating core 118, an electric motor 190, and an electric compressor 210. The electric motor 190 may drive the main shaft 126, and/or may be driven by the main shaft, for example to generate electricity during cruise and/or descent conditions. The electric compressor 210 comprises an electric motor 212 and a compressor section 214. The electric motor 212 is configured to power the compressor section 214.

The fan section 112 includes a fan case 122 that receives a fan 124 that extends from a rotating hub 123 and fan guide vanes 125 that extend from a static structure such as an inner fixed structure 127. The rotating hub 123 and the fan 124 are driven by a fan shaft or a main shaft 126 (e.g. low speed spool) that extends between the fan section 112 and the turbine section 114 along a central longitudinal axis 128. The main shaft 126 extends through the inner fixed structure 127 to rotate the fan 124 and the hub 123 about the central longitudinal axis 128. In various embodiments, the main shaft 126 is operatively coupled to the fan 124 and the hub 123 via a gear box 131 (e.g., a planetary gear box).

Figure 2A:
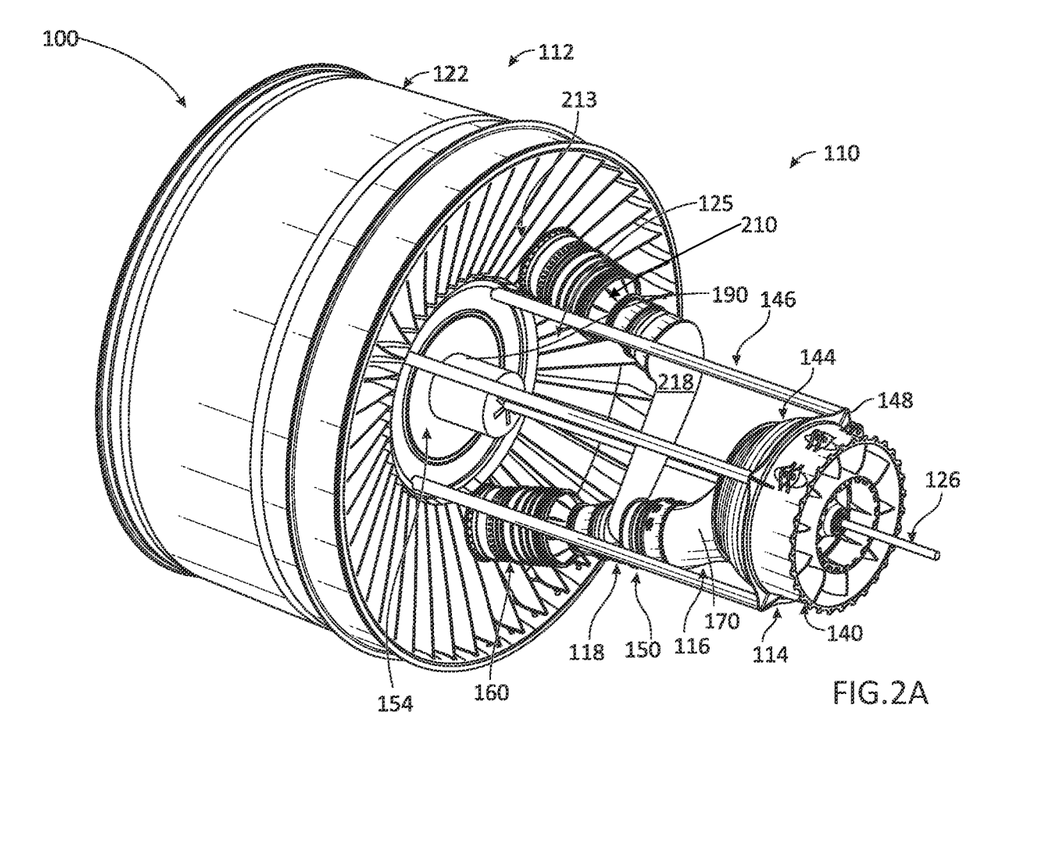
FIG. 2A illustrates a perspective view of the hybrid electric gas turbine engine, in accordance with various embodiments.
Figure 2B:
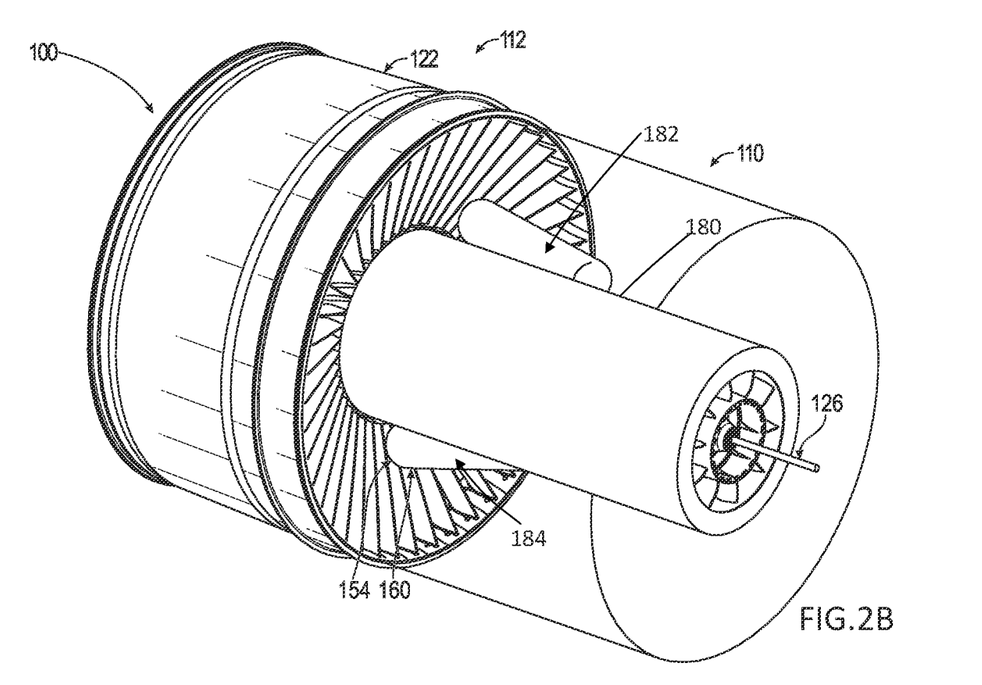
FIG. 2B illustrates a perspective view of the hybrid electric gas turbine engine, in accordance with various embodiments.

FIG. 2A illustrates a perspective view of a hybrid electric gas turbine engine 100 with the shrouds 180, 182, 184 removed for clarity. FIG. 2B illustrates a perspective view of a hybrid electric gas turbine engine 100 with the shrouds 180, 182, 184 shown. Referring to FIGS. 1, 2A and FIG. 2B, the turbine section 114 is disposed axially downstream of the fan section 112 along the central longitudinal axis 128. The turbine section 114 includes an exit housing 140 and a turbine 142. The exit housing 140 and the turbine 142 are operatively and/or fluidly connected to at least one gas generating core 118 and at least one electric compressor 210. A turbine housing 144 is arranged to receive a fluid flow from at least one gas generating core 118 and/or electric compressor 210 to rotate the turbine 142. The turbine 142 is rotatably disposed within the turbine housing 144 that is operatively connected to the exit housing 140. The turbine 142 is drivably connected to the fan 124 through the main shaft 126.

In various embodiments, gas generating core 118 is in operation during takeoff, climb, and cruise conditions. In various embodiments, ground idle may be accomplished with power from electric motor 190 and/or electric compressor 210. In various embodiments, ground idle may be accomplished with power from gas generating core 118. Takeoff power may be reached by using all power sources combined (e.g., gas generating core 118, electric motor 190, and electric compressor 210). In various embodiments, gas generating core 118 is sized and configured to provide between 20% and 50% of maximum static take-off thrust, electric motor 190 may be sized and configured to provide between 20% and 50% of maximum static take-off thrust, and/or electric compressor 210 may be sized and configured to provide between 20% and 50% of maximum static take-off thrust. In various embodiments, gas generating core 118 is sized and configured to provide between 25% and 45% of maximum static take-off thrust, electric motor 190 may be sized and configured to provide between 25% and 45% of maximum static take-off thrust, and/or electric compressor 210 may be sized and configured to provide between 25% and 45% of maximum static take-off thrust. In various embodiments, gas generating core 118 is sized and configured to provide approximately a third of maximum static take-off thrust, electric motor 190 may be sized and configured to provide approximately a third of maximum static take-off thrust, and/or electric compressor 210 may be sized and configured to provide approximately a third (e.g., the remainder) of the maximum static take-off thrust.

A support structure 146 extends between and operatively connects the static structure (e.g. inner fixed structure 127) of the fan section 112 and the exit housing 140. In such an embodiment, a mounting flange 148 radially extends from the exit housing 140. The support structure 146 is operably connected to the mounting flange 148. Additional support structures, such as structural beams or cross-beams may be provided to add stiffness.

At least one gas generating core 118 may include a core engine or gas generating core 150 radially offset from the central longitudinal axis 128. In other embodiments, additional or fewer gas generating cores may be provided. The gas generating core 150 is axially disposed between the fan section 112 and the turbine section 114, with respect to the central longitudinal axis 128. The gas generating core 150 may be a single spool gas generator, a dual spool gas generator, or a multispool gas generator. The gas generating core 150 is positioned to receive air from the fan 124 and drive the turbine 142 that in turn drives the fan 124.

The fan 124 delivers air into the fan case 122 and a portion of the air passes through an inlet duct 154 of the gas generating core 150 and into the gas generating core 150. In various embodiments, the inlet duct 154 is disposed radially outward from the inner fixed structure 127. In various embodiments, the inlet duct 154 is axially aligned with fan guide vanes 125. In various embodiments, a radially inward portion of the inlet duct 154 is partially defined by the inner fixed structure 127. Stated differently, inner fixed structure 127 may be disposed radially inward from the inlet duct 154. In this regard, the fan 124 may deliver air into the fan case 122 and the air passes through fan guide vanes 125 and a portion of this air flowing through fan exit guide vanes may pass through inlet duct 154 of the gas generating core 150 and into the gas generating core 150. A portion of the inlet duct 154 may be disposed radially outward from a radially inward end of at least one of the guide vanes 125. The gas generating core 150 includes a compressor section 160 driven by a shaft that extends along an axis 162 that is disposed in a non-parallel relationship with the central longitudinal axis 128. The shaft is in turn, driven by a turbine section 164 that drives the compressor section 160. A combustor section 166 is positioned between the compressor section 160 and the turbine section 164.

The exhaust duct 116 extends from the turbine section 164 of the gas generating core 150 towards the turbine section 114. The products of combustion, from the turbine section 164 of the gas generating core 150, pass through the exhaust duct 116 and across the turbine 142, which rotates about the central longitudinal axis 128 to, in turn, rotate the main shaft 126 and the fan 124. The exhaust duct 116 extends from an end of the turbine section 164 of gas generating core 150 to fluidly connect the gas generating core 150 to the turbine section 114.

The gas generating core 150 extends about or extends along the axis 162, which is offset, or angularly skewed, relative to the central longitudinal axis 128 of the main shaft 126 such that the gas generating core 150 is radially offset, angularly skewed, or disposed in a non-parallel relationship relative to the central longitudinal axis 128 of the main shaft 126.

Similarly, the electric compressor 210 extends about or extends along an axis 262, which is offset, or angularly skewed, relative to the central longitudinal axis 128 of the main shaft 126 such that the electric compressor is radially offset, angularly skewed, or disposed in a non-parallel relationship relative to the central longitudinal axis 128 of the main shaft 126.

In various embodiments, the electric compressor 210 comprises a compressor inlet duct 213 and compressor outlet 216. In various embodiments, the compressor inlet duct 213 is disposed radially outward from the inner fixed structure 127. In various embodiments, the compressor inlet duct 213 is axially aligned with fan guide vanes 125. In various embodiments, a radially inward portion of the compressor inlet duct 213 is partially defined by the inner fixed structure 127. Inner fixed structure 127 may be disposed radially inward from the compressor inlet duct 213. In this regard, the fan 124 may deliver air into the fan case 122 and the air passes through fan guide vanes 125 and a portion of this air flowing through fan exit guide vanes 125 may pass through compressor inlet duct 213 of the electric compressor 210. A portion of the compressor inlet duct 213 may be disposed radially outward from a radially inward end of at least one of the guide vanes 125. The compressor inlet duct 213 may be disposed radially outward from the central longitudinal axis 128.

The compressor outlet 216 is in fluid communication with the combustor section 166 of the gas generating core 150. For example, a discharge duct 218 extends from the compressor outlet 216 to a diffuser inlet 165 of the combustor section 166. In various embodiments, the compressor outlet 216 may comprise a mixing valve configured to open or close based on a given operating mode (e.g., close when electric compressor 210 is off and/or open when electric compressor 210 is on).

The offset gas generating core architecture, combined with an offset electric compressor provides for the use of a much smaller gas generating core(s). For example, the gas generating core 150 may be smaller than traditional gas turbine engine cores because the gas generating core 150 is not built around the main shaft 126 that drives the fan. Additionally, the gas generating core 150 may be sized and configured to provide between 30% and 80% of the turbine section 164 airflow of the gas generating core 150, and the electric compressor 210 may be sized and configured to provide between 30% and 80% of the turbine section 164 airflow of the gas generating core 150. In this regard, in various embodiments, the gas generating core may be sized in this manner to balance the size of the gas generating core with a cruise efficiency of the hybrid electric gas turbine engine 100. In various embodiments, the gas generating core 150 may be sized and configured to provide between 40% and 60% of the turbine section 164 airflow of the gas generating core 150, and the electric compressor 210 may be sized and configured to provide between 40% and 60% of the turbine section 164 airflow of the gas generating core 150. In various embodiments, the gas generating core 150 may be sized and configured to provide approximately half of the turbine section 164 airflow of the gas generating core 150, and the electric compressor 210 may be sized and configured to provide approximately half (e.g., the remainder of the turbine section 164 airflow of the gas generating core 150).

Efficiency of the hybrid electric gas turbine engine 110 may be improved by reducing the size of the high speed spool, reducing the size of the shaft within the gas generating core 150, reducing the airflow produced by the gas generating core 150 to the turbine section 164 of the gas generating core, and/or operating the gas generating core 150 at an elevated high overall pressure ratio. In this manner, overall efficiency of the engine is improved. For example, electric compression providing approximately half of the gas generating core 150 turbine section 164 airflow may provide between 20% and 30% thrust-specific fuel consumption improvement alone.

The reduced size of the gas generating core 150 provides for the integration of the electric motor 190 within the footprint of the inner fixed structure 127 of the fan section 112. As shown in FIG. 1, a shroud (e.g., shrouds 180, 182, 184) may be disposed about gas generating core 150, about the electric motor 190, and/or about the electric compressor 210. The first shroud 180 may axially extend, relative to the central longitudinal axis 128, from the static structure (e.g. the inner fixed structure 127) towards the turbine 142 of the turbine section 114. The first shroud 180 may at least partially define the footprint of the inner fixed structure 127 of the fan section 112. The second shroud 182 may at least partially enclose the electric compressor 210 and extend from the turbine 142 to an outer surface of the electric compressor 210. The third shroud 184 may at least partially enclose the gas generating core 150 and extend from the turbine 142 to an outer surface of the gas generating core 150.

The electric motor 190 is disposed radially inward from the gas generating core 150 and the electric compressor 210. In some embodiments, an additional electric motor may be provided that is remotely located.

Figure 3:
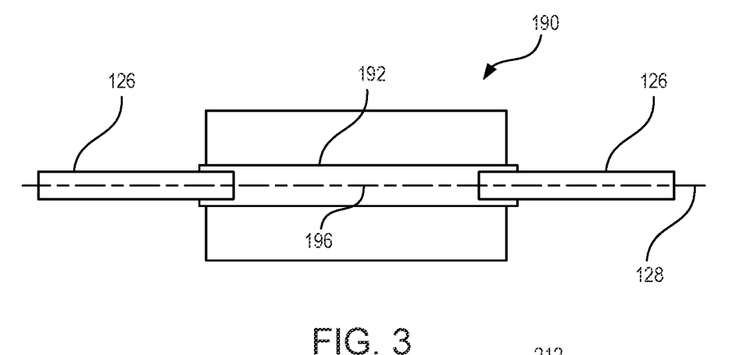
FIG. 3 illustrates a schematic view of an electric motor drivably coupled to a main shaft of the hybrid electric gas turbine engine, in accordance with various embodiments.

With combined reference to FIGS. 2A, 2B, and FIG. 3, the electric motor 190 includes a rotatable shaft 192 that extends along an electric motor axis 196. The electric motor axis 196 is coaxial with the central longitudinal axis 128. The electric motor axis 196 is spaced apart from axis 162. The shaft 192 of the electric motor 190 drivably connects the electric motor 190 to the main shaft 126 such that the electric motor 190 may be driven by the main shaft 126 and/or the electric motor 190 may drive the hybrid electric gas turbine engine 110. The electric motor 190 may be configured to act as a motor in a motor configuration and the electric motor 190 may be configured to act as a generator in a generator configuration. A motor configuration includes when electric energy is converted to mechanical energy (e.g., electrical energy to rotational kinetic energy). A generator configuration includes when mechanical energy is converted to electrical energy (e.g., rotational kinetic energy to electrical energy).

Figure 7A:
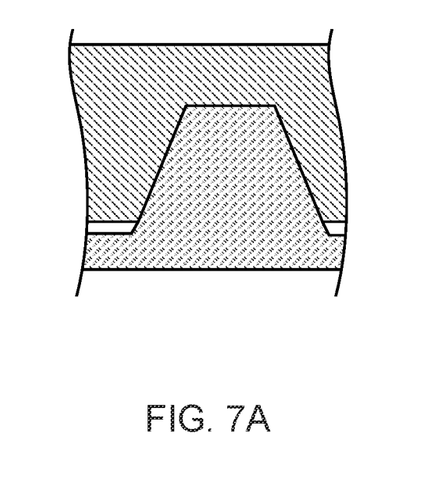
FIG. 7A illustrates a spline connection of a shaft, in accordance with various embodiments.
Figure 7B:
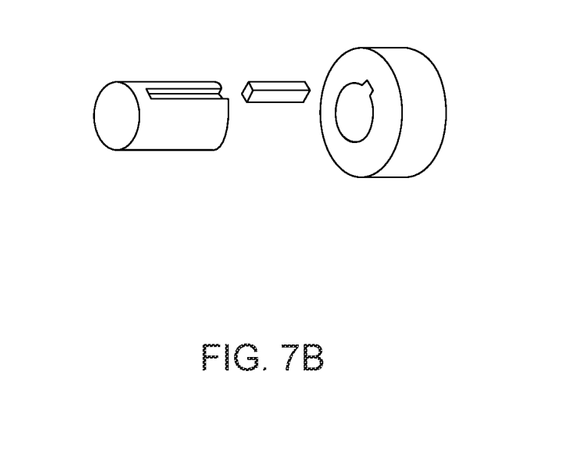

The shaft 192 may provide the transfer of rotary motion from the electric motor 190 to the main shaft 126 and vice versa. In various embodiments, the shaft 192 rotates at the same rotational velocity as the main shaft 126. Shaft 192 may be directly coupled to main shaft 126 via a splined connection (FIG. 7A), a keyed connection (FIG. 7B), a clamped connection, or any other suitable connection for end-to-end shaft connections. In various embodiments, main shaft 126 may be split into two separate shaft portions extending from opposite ends of electric motor 190. In various embodiments, electric motor 190 may receive electrical power from one or more batteries located on board the aircraft, in the nacelle, or the like.

Figure 4:
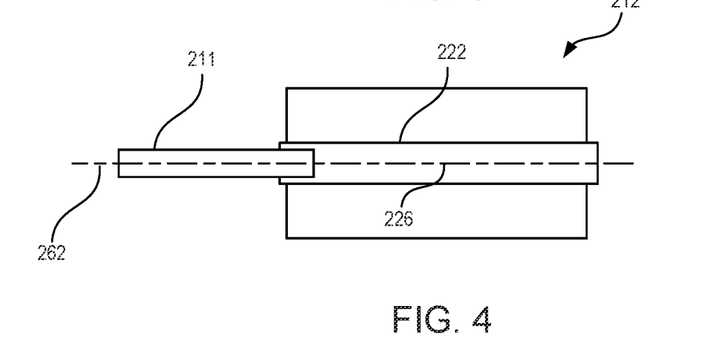
FIG. 4 illustrates a schematic view of an electric motor drivably coupled to a shaft of an electric compressor of a hybrid electric gas turbine engine, in accordance with various embodiments.

With combined reference to FIGS. 1, 2 and 4, the electric motor 212 includes a rotatable shaft 222 that extends along an electric motor axis 226 is co-axial to the axis 262 of the electric compressor 210. The electric motor axis 226 is offset, or angularly skewed, relative to the central longitudinal axis 128. The electric motor axis 226 is spaced apart from axis 162. The shaft 222 of the electric motor 212 drivably connects the electric motor 212 to the electric compressor shaft 211 such that the electric motor 212 may drive the electric compressor 210.

The shaft 222 may provide for the transfer of rotary motion from the electric motor 212 to the electric compressor shaft 211. In various embodiments, the shaft 222 rotates at the same rotational velocity as the electric compressor shaft 211. Shaft 222 may be directly coupled to electric compressor shaft 211 via a splined connection (FIG. 7A), a keyed connection (FIG. 7B), a clamped connection, or any other suitable connection for end-to-end shaft connections. In various embodiments, shaft 222 may be disposed at an aft end of electric compressor 210. In various embodiments, the shaft 222 may be split into two separate shaft portions extending from opposite ends of electric motor 212, as illustrated with respect to electric motor 190 in FIG. 3. In various embodiments, electric motor 212 may receive electrical power from one or more batteries located on board the aircraft.

Figure 5:
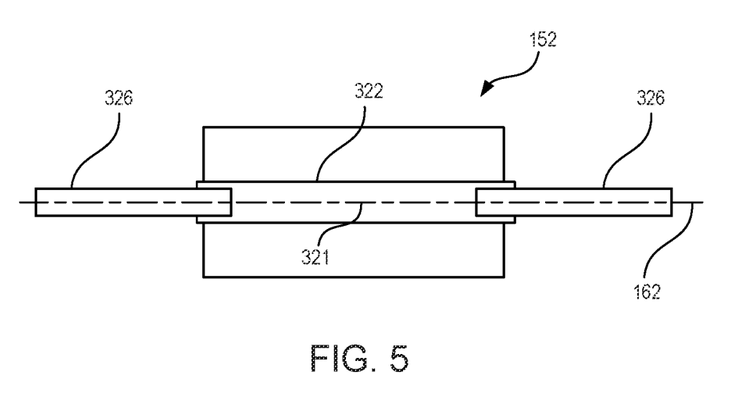
FIG. 5 illustrates a schematic view of an electric motor drivably coupled to a shaft of a gas generating core of a hybrid electric gas turbine engine, in accordance with various embodiments.

With combined reference to FIGS. 1, 2 and 5, gas generating core 150 may further comprise an electric motor 152. The electric motor 152 includes a rotatable shaft 322 that extends along an electric motor axis 321 that is co-axial to the axis 162 of the gas generating core 150. The electric motor axis 321 is offset, or angularly skewed, relative to the central longitudinal axis 128. The electric motor axis 321 is spaced apart from axis 262. The shaft 322 of the electric motor 152 drivably connects the electric motor 152 to the shaft 322 such that the electric motor 152 may be driven by the gas generating core shaft 326 and/or the electric motor 152 may drive the gas generating core shaft 326. The electric motor 152 may be configured to act as a motor in a motor configuration and the electric motor 152 may be configured to act as a generator in a generator configuration.

The shaft 322 may provide for the transfer of rotary motion from the electric motor 152 to the gas generating core shaft 326 and vice versa. In various embodiments, the shaft 322 rotates at the same rotational velocity as the gas generating core shaft 326. Shaft 322 may be directly coupled to gas generating core shaft 326 via a splined connection (FIG. 7A), a keyed connection (FIG. 7B), a clamped connection, or any other suitable connection for end-to-end shaft connections. In various embodiments, gas generating core shaft 326 may be split into two separate shaft portions extending from opposite ends of electric motor 152. In various embodiments, electric motor 152 may receive electrical power from one or more batteries located on board the aircraft.

Figure 6:
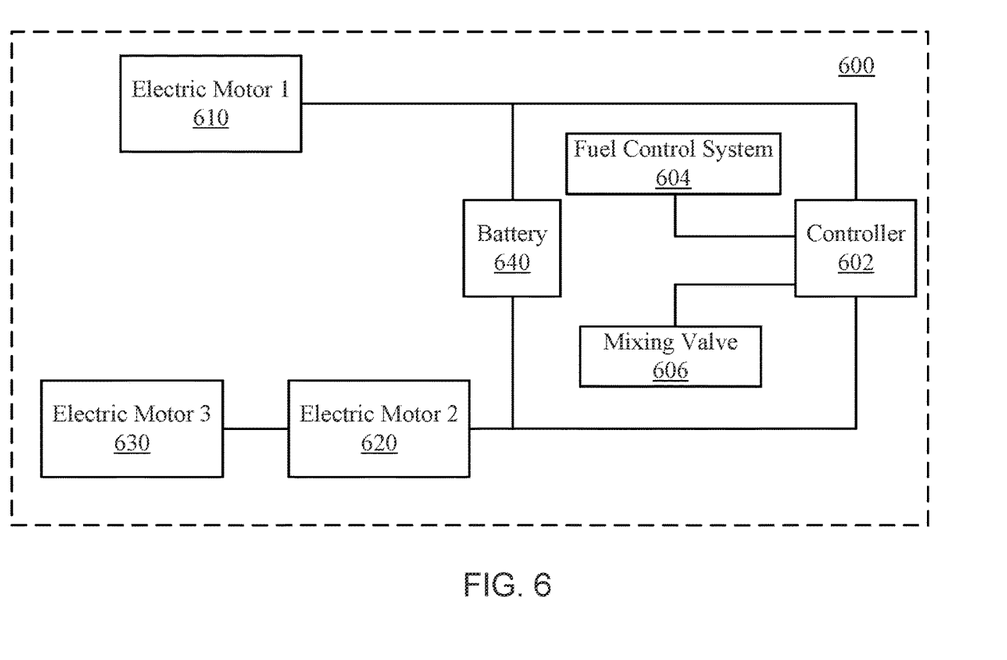
FIG. 6 illustrates a control system of the hybrid electric gas turbine engine, in accordance with various embodiments.

In various embodiments and with additional reference to FIG. 6, a schematic block diagram of a control system 600 including a method of control for hybrid electric gas turbine engine 100 from FIG. 1. Control system 600 includes a controller 602 in electronic communication with a first electric motor 610 (e.g., electric motor 212 of electric compressor 210), a second electric motor 620 (e.g., electric motor 152 of gas generating core 150), a third electric motor 630 (e.g., electric motor 190), and a battery 640. In various embodiments, controller 602 may be integrated into computer systems onboard aircraft. In various embodiments, controller 602 may be configured as a central network element or hub to access various systems, engines, and components of control system 600. Controller 602 may comprise a network, computer-based system, and/or software components configured to provide an access point to various systems, engines, and components of control system 600. In various embodiments, controller 602 may comprise a processor. In various embodiments, controller 602 may be implemented in a single processor. In various embodiments, controller 602 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 602 may comprise a processor configured to implement various logical operations in response to execution of instructions, for example, instructions stored on a non-transitory, tangible, computer-readable medium configured to communicate with controller 602.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se and does not relinquish rights to all standard computer-readable media that are not only propagating transitory signals per se.

In various embodiments, controller 602 may be in electronic communication with one or more of a battery 640. Battery 640 may be disposed in hybrid electric gas turbine engine 100, an aircraft, or the like. Controller 602 may be configured to command battery 640 to discharge power, remain neutral, or to charge. In this regard, second electric motor 620 and third electric motor 630 may be configured to act as generators to charge battery 640, battery 640 may discharge power to first electric motor 610, second electric motor 620, and/or third electric motor 630, and/or all electric motors may be off when no battery power is available (e.g., hybrid electric gas turbine engine may operate solely on gas generating core 150). For example, when the battery 640 is to be charged, controller 602 may command second electric motor 620 and/or third electric motor 630 to act as generators and/or to charge battery 640. When battery 640 has no battery power available, controller 602 may command second electric motor 620 and/or third electric motor 630 to act as generators for first electric motor 610.

In various embodiments, to provide a power boost to a hybrid electric gas turbine engine, the controller 602 may discharge battery 640 to provide power to first electric motor 610 and third electric motor 630. During the power boost, the second electric motor 620 may act as a generator, as the second electric motor may be coupled to gas generating core 150.

In various embodiments, the first electric motor 610 may be configured to operate in a motor configuration only. In contrast, the second electric motor 620 and the third electric motor 630 may be configured to operate in a motor configuration and a generator configuration. In this regard, second electric motor 620 and third electric motor 630 may be configured to charge battery 640 and/or power first electric motor 610. Additionally, battery 640 may be configured to power first electric motor 610, second electric motor 620, and/or third electric motor 630.

In various embodiments, the control system may further comprise a fuel control system 604 and/or a mixing valve 606. Fuel control system 604 may be configured to control and/or deliver fuel to the combustor section 166 of gas generating core 150. The mixing valve 606 may be disposed at the compressor outlet 216 of the electric compressor 210 and may be configured to operate between a closed configuration and an open configuration. The controller 602 may be in operative communication with the fuel control system 604 and the mixing valve 606.

In various embodiments, the control system 600 may operate the hybrid electric gas turbine engine in various modes. For example, in a motor mode, each motor can be powered by the battery 640 (i.e., first electric motor 610, second electric motor 620, and third electric motor 630 may all be powered by the battery 640). In various embodiments, first electric motor 610 may be powered by the battery 640, by the second electric motor 620, by the third electric motor 630, or by any combination thereof. In various embodiments, the second electric motor 620 may be powered by the battery 640, by the third electric motor, or by any combination thereof. In various embodiments, third electric motor 630 may be powered by the battery 640, by the second electric motor 620, or by any combination thereof. In a generator mode, the second electric motor 620 and the third electric motor 630 can charge battery 640, can power the first electric motor 610, or the like.

In various embodiments, the battery 640 may supplement power to drive the compressor section 160 of the gas generating core 150. In this regard, the thrust specific fuel consumption (TSFC) may further be improved between 5% and 10%. The battery 640 may further supplement power to drive the fan 124 of the hybrid electric gas turbine engine 100. In this regard, the thrust specific fuel consumption (TSFC) may further be improved between 5% and 10%. The hybrid electric gas turbine engine 100 may allow the turbine 142 of turbine section 114 of the hybrid electric gas turbine engine 100 to provide electric power to the electric compressor 210. Fuel power may also be converted to electric power via the second electric motor 620 (e.g., electric motor 152 of gas generating core 150). The hybrid electric gas turbine engine 100 may be configured to operate with a depleted battery via gas generating core 150 only, with gas generating core at least partially powering at least one of the first electric motor 610 or the third electric motor 630, or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An engine, comprising:
   a fan section having a fan;
   a first turbine section having a turbine drivably connected to the fan through a main shaft that extends along a central longitudinal axis;
   a first electric motor drivably connected to the main shaft; and
   an electric compressor extending along a first axis that is disposed in a non-parallel relationship to the central longitudinal axis, wherein a motor axis of the first electric motor is parallel or coincident with the central longitudinal axis.

2. The engine of claim 1, wherein:
   the electric compressor comprises a second electric motor including a second motor shaft extending along a second electric motor axis, and
   the second electric motor axis is parallel with the first axis.

3. The engine of claim 2, further comprising a third electric motor including a third motor shaft extending along a third electric motor axis, the third electric motor axis being parallel with a second axis.

4. The engine of claim 3, wherein:
   the third electric motor is configured to drive the electric compressor,
   the third electric motor is configured to drive a core, and
   the third electric motor is configured to be driven by the core.

5. The engine of claim 1, wherein:
   the first electric motor is configured to drive the fan, and
   the first electric motor is configured to be driven by the fan.

6. The engine of claim 1, wherein a core is sized and configured to provide between 30% and 80% of an airflow to a second turbine section.

7. The engine of claim 1, further comprising a discharge duct disposed between a compressor outlet of the electric compressor and a diffuser inlet of a core.

8. The engine of claim 1, further comprising:
   a core extending along a second axis that is radially offset from the central longitudinal axis, the core including a second turbine section;
   the first electric motor being radially offset from the core; and
   the electric compressor in fluid communication with the second turbine section.

9. The engine of claim 8, further comprising a support structure that extends between and operatively connects a static structure of the fan section and an exit housing of the second turbine section.

10. The engine of claim 8, wherein the electric compressor comprises a second electric motor, and wherein the engine further comprises a third electric motor drivably coupled to a shaft defining a shaft axis that is co-axial with the first axis.

11. The engine of claim 10, further comprising a battery electrically coupled to the first electric motor, the second electric motor, and the third electric motor.

12. The engine of claim 11, wherein at least one of the first electric motor and the third electric motor are configured to charge the battery.

13. The engine of claim 10, further comprising a controller operatively coupled to the first electric motor, the second electric motor, and the third electric motor, the controller configured to command at least one of the first electric motor and the third electric motor to power the second electric motor.

14. An engine, comprising:
a fan section having a fan;
a first turbine section having a turbine drivably connected to the fan through a main shaft that extends along a central longitudinal axis;
a core extending along a first axis that is radially offset from the central longitudinal axis, the core comprising a second turbine section;
a first electric motor drivably connected to the main shaft, the first electric motor having a central axis parallel with the central longitudinal axis; and
a controller operably coupled to the first electric motor, the controller configured to command a second electric motor to power the first electric motor.

15. The engine of claim 14, wherein the first electric motor is configured to drive the fan, and the first electric motor is configured to be driven by the fan.

16. The engine of claim 14, wherein the core is sized and configured to provide between 30% and 80% of an airflow to the second turbine section.

17. The engine of claim 14, wherein:
the fan section further comprises a static structure and a guide vane extending from the static structure, and
a support structure extends between and operatively connects the static structure to an exit housing of the first turbine section.

18. The engine of claim 14, further comprising the second electric motor, wherein the second electric motor is connected to a second shaft of the core.

19. An engine, comprising:
a fan section having a fan;
a first turbine section having a turbine drivably connected to the fan through a main shaft that extends along a central longitudinal axis;
a first electric motor drivably connected to the main shaft; and
an electric compressor extending along a first axis that is disposed in a non-parallel relationship to the central longitudinal axis, the electric compressor comprising a second electric motor.

20. The engine of claim 19, further comprising a third electric motor drivably coupled to a shaft defining a shaft axis that is co-axial with the first axis.

* * * * *